US005164923A

United States Patent [19]

Avis

[11] Patent Number: 5,164,923

[45] Date of Patent: Nov. 17, 1992

[54] CUMULATIVE OPERATIONAL TIMERS AND METHODS FOR CELLULAR TELEPHONES

[75] Inventor: Graham Avis, San Diego, Calif.

[73] Assignee: Hughes Aircraft Company, Los Angeles, Calif.

[21] Appl. No.: 772,898

[22] Filed: Sep. 26, 1991

[51] Int. Cl.[5] .................... G04B 47/00; H04M 11/00

[52] U.S. Cl. .................... 368/4; 368/10; 368/113; 379/59

[58] Field of Search .................... 368/719, 10, 107-113; 379/58-59; 455/115, 117, 127, 343

[56] References Cited

U.S. PATENT DOCUMENTS 4,903,327 2/1990 Raghuram .................... 455/127
5,036,532 7/1991 Metroka et al. .................... 379/58
5,046,082 9/1991 Zicker et al. .................... 379/59

*Primary Examiner*—Vit W. Miska

*Attorney, Agent, or Firm*—Gordon R. Lindeen, III; Steven M. Mitchell; Wanda K. Denson-Low

[57] ABSTRACT

Cumulative timers are used in a cellular telephone to record total mobile "ON" time and total transmitter "ON" time. These "ON" times are periodically stored in long term nonvolatile memory. The period is chosen such that a time-limited number of write cycles of the nonvolatile memory are not exceeded over the life of the dual mode subscriber unit. As a consequence of utilizing periodic updates, rather than power-up event driven updates, solves this problem of the limited lifetimes of the nonvolatile memory device is solved. The use of the cumulative timers and its related computational method in a mobile telephone permits factory personnel to calculate actual mean time between failure data based upon customer returns. Timer information provided by the cumulative timers and computational method may also be used to indicate warranty fraud.

23 Claims, 3 Drawing Sheets

CUMULATIVE OPERATIONAL TIMERS AND METHODS FOR CELLULAR TELEPHONES

BACKGROUND

The present invention relates generally to cellular telephones, and more particularly, to cumulative operational timers and timing computational methods for use in such cellular telephones.

U.S. Pat. No. 4,903,327, entitled "Cellular Telephone With Transmission-On and Radio-On Timers" attempts to address an operational timer problem that exists in the cellular telephone environment. Previous operational timer designs, such as that disclosed in the above-cited patent, have stored nonvolatile memory data at power down time. While this is relatively important thing to do, it can lead to early device failures of typical nonvolatile memory circuits.

An electronically erasable programmable read-only memory (EEPROM), often used as the nonvolatile memory device, only permits about 10,000 write cycles under typical operating conditions. This limit can be further reduced in the demanding mobile telephone environment. For commercial applications of cellular telephony (sales people, police, taxis, etc.), a mobile telephone can have ten or more ON/OFF power cycles per day. A write cycle at each power cycle would lead to an unacceptable device life on the order of 1000 days.

The use of cumulative timers in a mobile telephone is very desirable, in that it permits factory personnel to calculate actual mean time between failure (MTBF) data based upon customer returns. Timer information may also be used to indicate warranty fraud.

Accordingly, it would be an advance in the mobile telephone art to have a cellular telephone design that incorporates a cumulative operational timer and a timing computation method that are not subject to the above deficiencies. It is also an objective of the present invention to provide for an operational timer design and timing computational method that permits factory personnel to calculate mean time between failure (MTBF) data to determine possible warranty fraud.

SUMMARY OF THE INVENTION

In order to meet the above objectives and overcome the above deficiencies, the present invention provides for a cumulative operational timer system for use in a cellular telephone. The system comprises a timer circuit for providing a first cumulative elapsed time value during which the cellular telephone is on and computational means, such as a software or firmware program, for monitoring and recording the first cumulative elapsed time value. Optionally, the computational means may also determine and record a second cumulative elapsed time value during which calls are made using the cellular telephone. A low power memory circuit is employed for storing the first and second cumulative time values determined by the computational means. A nonvolatile memory circuit is provided for storing the first and second cumulative time values in a nonvolatile manner at selected time intervals. The nonvolatile memory circuit stores the cumulative time values during times when power is removed from the cellular telephone. A digital signal processor is used for storing the first and second cumulative time values in the low power volatile memory circuit and in the nonvolatile memory circuit under control of the computational means.

One method in accordance with the present invention provides for a means of determining the cumulative time that a cellular telephone is operational and when calls are made using the cellular telephone. The method comprises the following steps. A first cumulative elapsed time value is provided during which the cellular telephone is on. The first cumulative elapsed time value during which the cellular telephone is on is monitored and recorded. Optionally, a second cumulative elapsed time value during which calls are made using the cellular telephone is determined and recorded. This is typically achieved using a low power memory circuit. The first and second cumulative time values are continuously stored while the system is on. The first and second cumulative time values are nonvolatilely stored at selected time intervals. This periodic storage of the first and second cumulative time values extends the lifetime of the nonvolatile memory that is used to store the time values.

More specifically, the present invention provides for the use of cumulative timers and a cumulative timing method in a cellular telephone to record total mobile "ON" time and total transmitter "ON" time. These times are periodically stored in long term nonvolatile memory. The period is chosen such that a time-limited number of write cycles of the nonvolatile memory is not exceeded over the life of the cellular telephone. As a consequence, periodic updates, rather than power-up event driven updates, solves this problem of the limited lifetime of the nonvolatile memory device.

The use of the cumulative timers and computational methods of the present invention in a mobile telephone permit factory personnel to calculate actual mean time between failure data based upon customer returns. Timer information provided by the cumulative timers and computational method may also be used to indicate warranty fraud.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
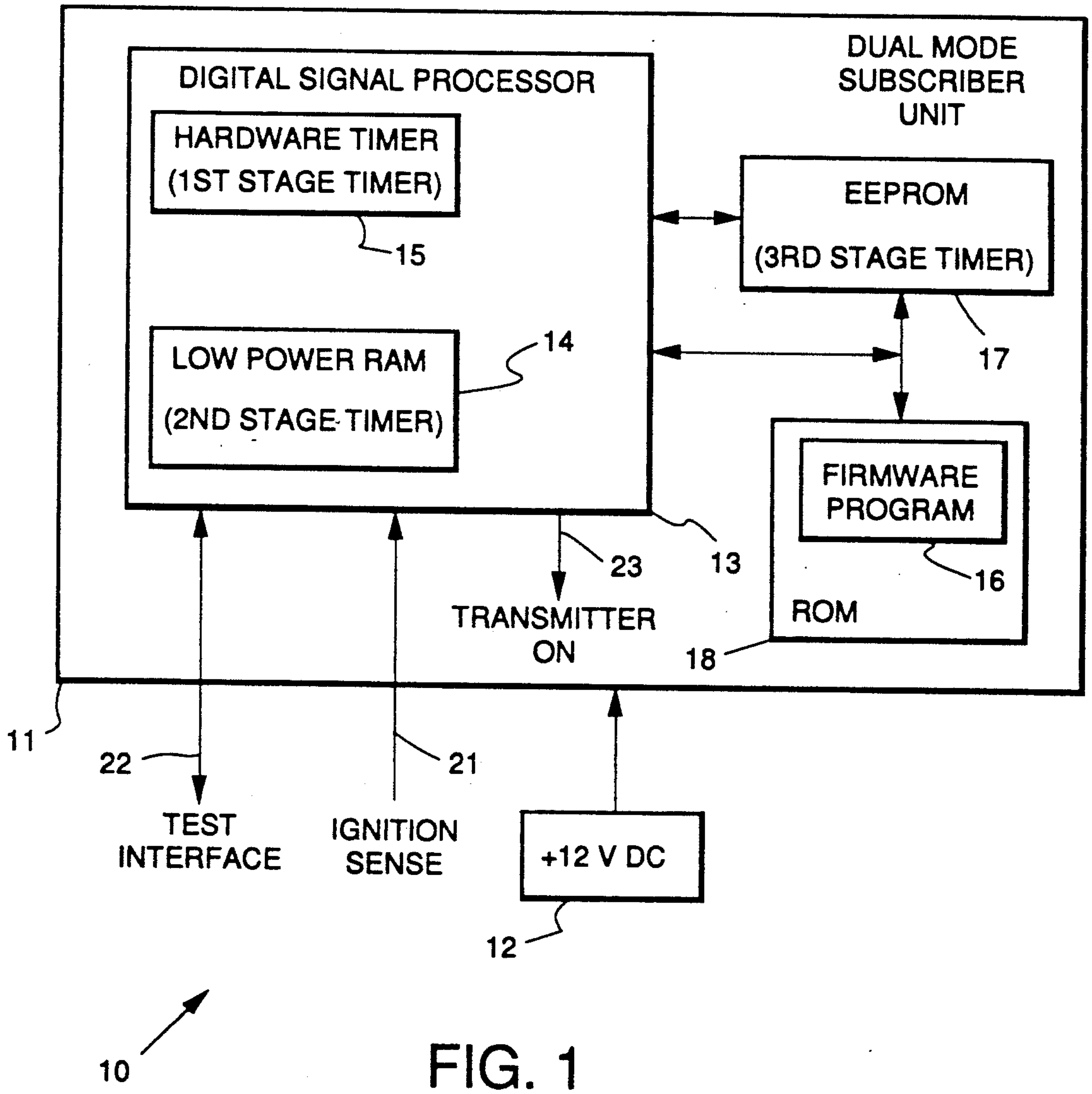
FIG. 1 illustrates a cumulative timer system for use in a cellular telephone made in accordance with the principles of the present invention.

Referring to FIG. 1, there is shown a cumulative timer system 10 for use in a cellular telephone, or dual mode subscriber unit 11 as is referred to herein, made in accordance with the principles of the present invention. The dual mode subscriber unit 11 comprises a battery power input that is coupled to a twelve volt battery 12, for example, such as is common in substantially all present day vehicles, an ignition sense input 21 for sensing vehicle start-up and/or shut-down, and a test interface 22 that provides a means for a technician, for example, to test and interrogate the dual mode subscriber unit 11, including the cumulative timer system 10 and to retrieve timer values therefrom.

The dual mode subscriber unit 11 comprises a digital signal processor 13 that includes a low power random access memory 14 (RAM) and a timer circuit 15, and an electronically erasable programmable read-only memory 17 (EEPROM 17) that is used as a nonvolatile memory device for the cumulative timer system 10. It is to be understood that the low power random access memory 14 may also be located in circuitry other than the digital signal processor 13, such as is provided by stand alone RAM circuits, for example. The digital signal processor 13 may be any conventional signal processor, such as a model TMS 320 C51, manufactured by Texas Instruments, Incorporated, for example. Furthermore, the signal processor 13 may be any conventional computer processor, and is not limited to the type of digital signal processor that is employed in the preferred embodiment of the present invention. The low power random access memory 14 and the timer circuit 15 are included as part of the TMS 320 C51 digital signal processor 13. However, these components may also be separately provided outside of the signal processor 13, if so desired.

Generally, the cumulative operational timer system 10 of the present invention comprises a three stage timer circuit with each stage having different timing resolution. The timer circuit 15 comprises a hardware timer whose clock resolution has a period that is typically on the order of one millisecond. The low power RAM timer 14 typically has a one millisecond resolution and a period that is eight hours, for example. The nonvolatile memory timer comprising the EEPROM 17 typically has an eight hour resolution, for example, and a period that is substantially unlimited.

The timer code, comprising the firmware or software 16 is a part of and is executed in the digital signal processor 13. The transmitter on timing is started and stopped using an internal software interface. The ROM 18 comprises a program memory, and the digital signal processor 13 executes the firmware program 16 stored therein. This will be described in more detail below.

The timer circuit 15 in the digital signal processor 13 is essentially a counter that provides an elapsed time measurement when the unit 11 is "ON", and which is monitored and controlled by way of the firmware program 16. The timer circuit 15 may be a modulo $2^n$ counter, for example, and the timer circuit 15 provides a predetermined time base. The second stage of the timer system 10 comprises the low-power RAM 14 that is maintained intact during a power down state of the dual mode subscriber unit 11. The firmware program 16 may be stored in a read only memory 18 or separate random access memory (not shown) that is part of the dual mode subscriber unit 11 or may be part of a separate circuit or circuit card similar to the dual mode subscriber unit 11. Elapsed time is measured whenever the dual mode subscriber unit 11 is in a power "ON" state. In addition, the firmware monitors and stores the amount of time the dual mode subscriber unit 11 is on during each phone conversation. This is monitored using the timer output signals and the transmitter "ON" signal 23 provided by the digital signal processor 13.

The power down state is generally entered when the "ignition sense" line becomes inactive. The dual mode subscriber unit 11 performs a soft power down under control of the firmware program 16, which causes removal of battery power from substantially all of the circuits thereof. The one exception is the digital signal processor 13 having the timer values stored in the low-power RAM 14. This low power random access memory 14 is maintained in its low power state which stores the cumulative timer values that are indicative of the transmitter "ON" time and the total "ON" time.

After a predetermined number of hours of operation (currently chosen to be eight) the cumulative time values for the two computations (unit "ON" time and transmitter "ON" time) are stored in the nonvolatile EEPROM memory 17. This preserves the information in the event of the removal of battery power from the dual mode subscriber unit 11. This storage action is elapsed time driven, making it independent of the ignition sense and transmitter "ON" transition events.

The low power RAM 14 is volatile in the sense that removal of battery power from the dual mode subscriber unit 11 erases its contents. When such an event occurs the latest state of each of the cumulative timer circuits is lost. In general, removal of battery power from the dual mode subscriber unit 11 is a relatively rare event. However, this information is not that critical since only a few hours of information will have been lost. While some timer information may be lost when battery power is removed from the dual mode subscriber unit 11, this is considered to be of minimal consequence given the purpose of the cumulative timer circuits 15, 16. For the purpose of calculating a mean time between failure MTBF value, the loss of a few hours of time will not greatly effect the result. Considerable benefit is gained, however, since the number of EEPROM 17 write cycles is greatly reduced, thus lengthening the operational lifetime of the dual mode subscriber unit 11.

The cumulative operational timer system 10 of the present invention is, in essence, comprised of three timer registers that are arranged in a progression from least to most significant digits. The least significant digits are provided by the timer circuit 15, while the most significant digits are provided by the nonvolatile memory circuit, EEPROM 17. When the hardware timer (timer circuit 15) period expires, one millisecond has passed. This event interrupts the digital signal processor 13 so that the softward program 16 can increment the second timer register which is stored in the low power RAM 14. Hence this timer register has a resolution of one millisecond. By design, the software program 16 wraps the register provided by the low power RAM 14 when an eight hour period has elapsed. This triggers an increment of the register provided by the EEPROM 17, the third one in the group. This causes a register provided by the EEPROM 17 to have a resolution of eight hours and an effectively limitless period, in that it never resets.

Figure 2:
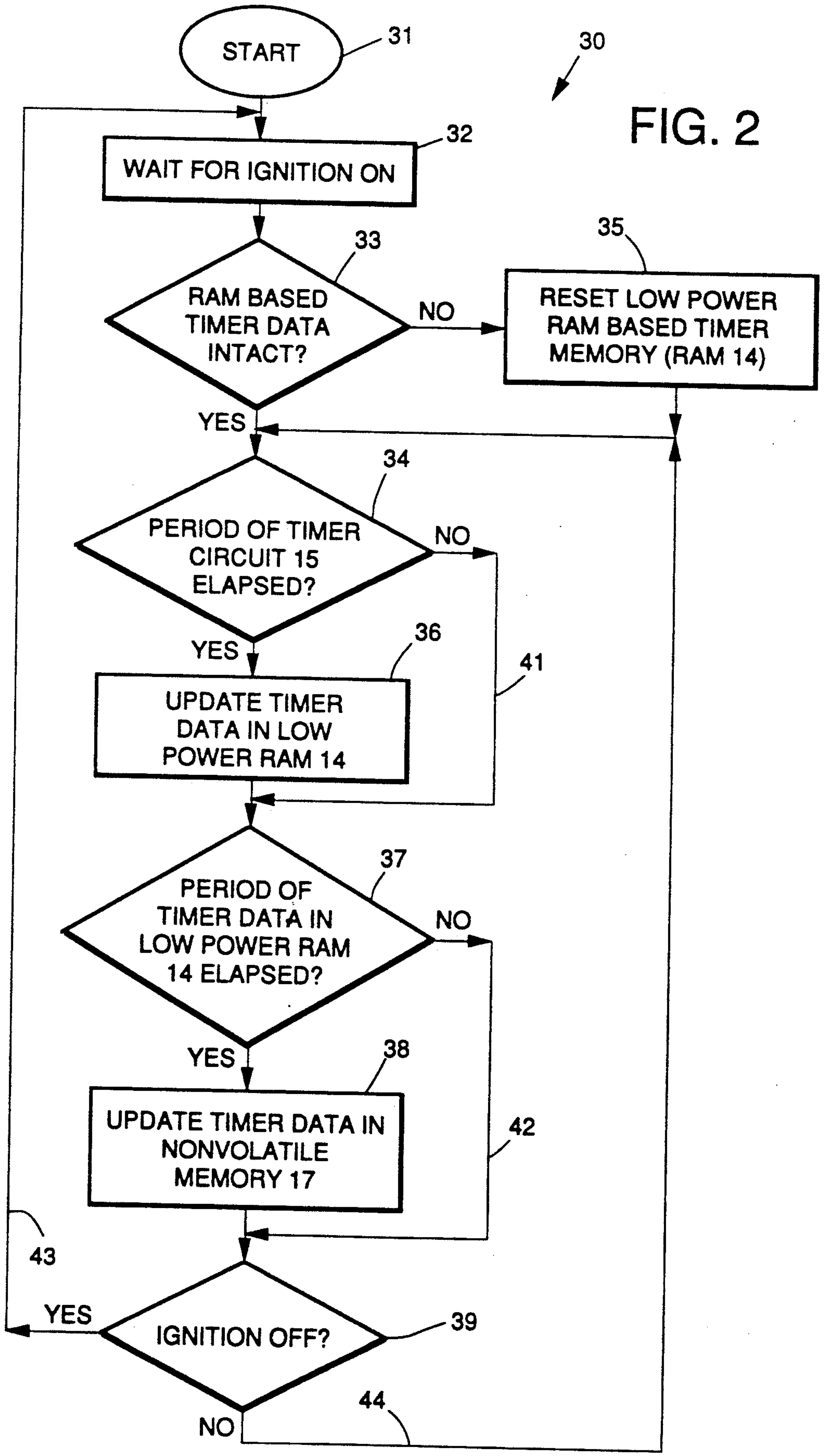
FIG. 2 illustrates a firmware flow diagram utilized in the cumulative timer system of FIG. 1 implemented in accordance with the principles of the present invention.

Referring to FIG. 2, it illustrates a firmware or software flow diagram of one method 30 utilized in the cumulative timer system 10 of FIG. 1 implemented in accordance with the principles of the present invention. The method 30 comprises the following steps. First the procedure is started, indicated by the START symbol 31. The method 30 then waits for an ignition "ON" signal, as indicated in box 32.

A decision is then made in box 33 whether the RAM based timer data in the low power RAM 14 is intact. If the decision is "YES", then the method 30 proceeds to box 34 where a decision is made whether the period of the timer circuit has elapsed. If the decision in box 33 is "NO", the RAM based timer memory comprising the lower power RAM 14 is reinitialized (reset). Then the method 30 proceeds to determine whether the period of the timer circuit has elapsed in box 34.

Figure 3:
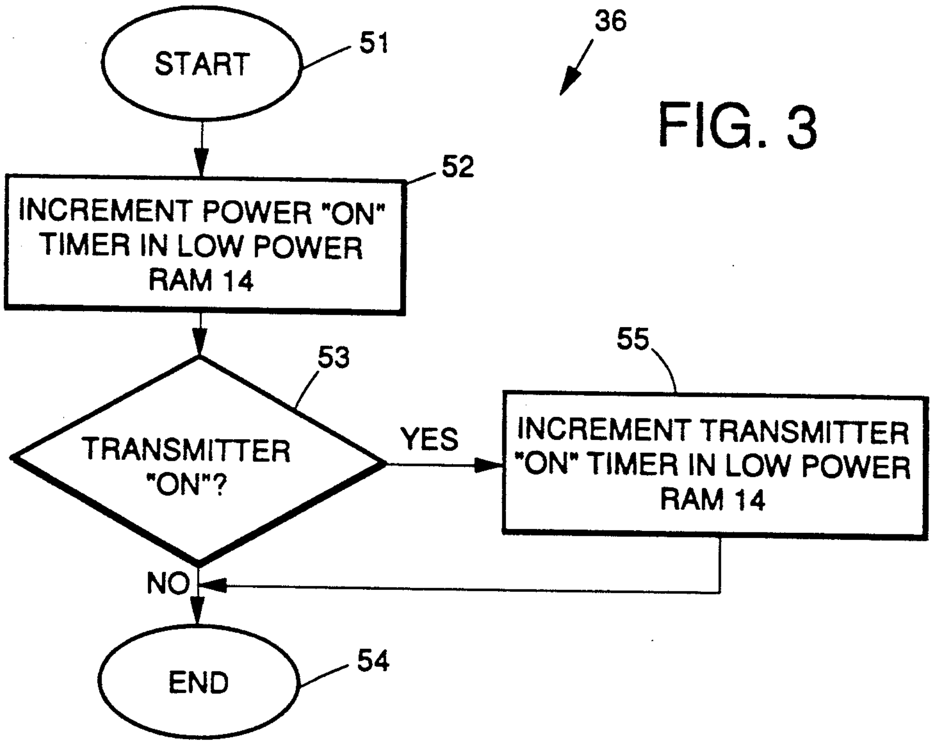
FIGS. 3 and 4 illustrate detailed flow diagrams of portions of the flow diagram of FIG. 2.

If the decision regarding whether the period of the timer circuit has elapsed is "YES", then the current time indicated by the timer circuit 15 is updated into the low power RAM 14, as indicated by box 36. FIG. 3 illustrates a detailed flow diagram of the updating step illustrated by box 36. With reference to FIG. 3, in the low power RAM updating step, the process is started as indicated by the start symbol 51, and then the power "ON" timer in the low power RAM 14 is incremented in step 52. A decision is then made whether the transmitter is on, as indicated by box 53. If the decision is yes, the transmitter "ON" timer in the low power RAM 14 is incremented, as indicated by box 55, and then the process stops and returns to the flow of FIG. 2, as indicated by the END symbol in box 54. If the transmitter is off, the process stops and returns to the flow of FIG. 2, indicated by the END symbol in box 54.

If the decision regarding whether the period of the timer circuit has elapsed is "NO", the updating step indicated in box 36 is bypassed by way of path 41. The method 30 then proceeds to box 37 where a decision is made whether the period of the timer data in the lower power RAM 15 has elapsed. If the decision is "YES", then the timer data stored in the nonvolatile memory 17 is incremented, as indicated in box 38. Thus, if eight hours have occured, for example, then the third stage of the timer circuit 15 is updated in the nonvolatile memory 17. If the decision is "NO", the incrementing step indicated in box 38 is bypassed by way of path 42.

Figure 4:
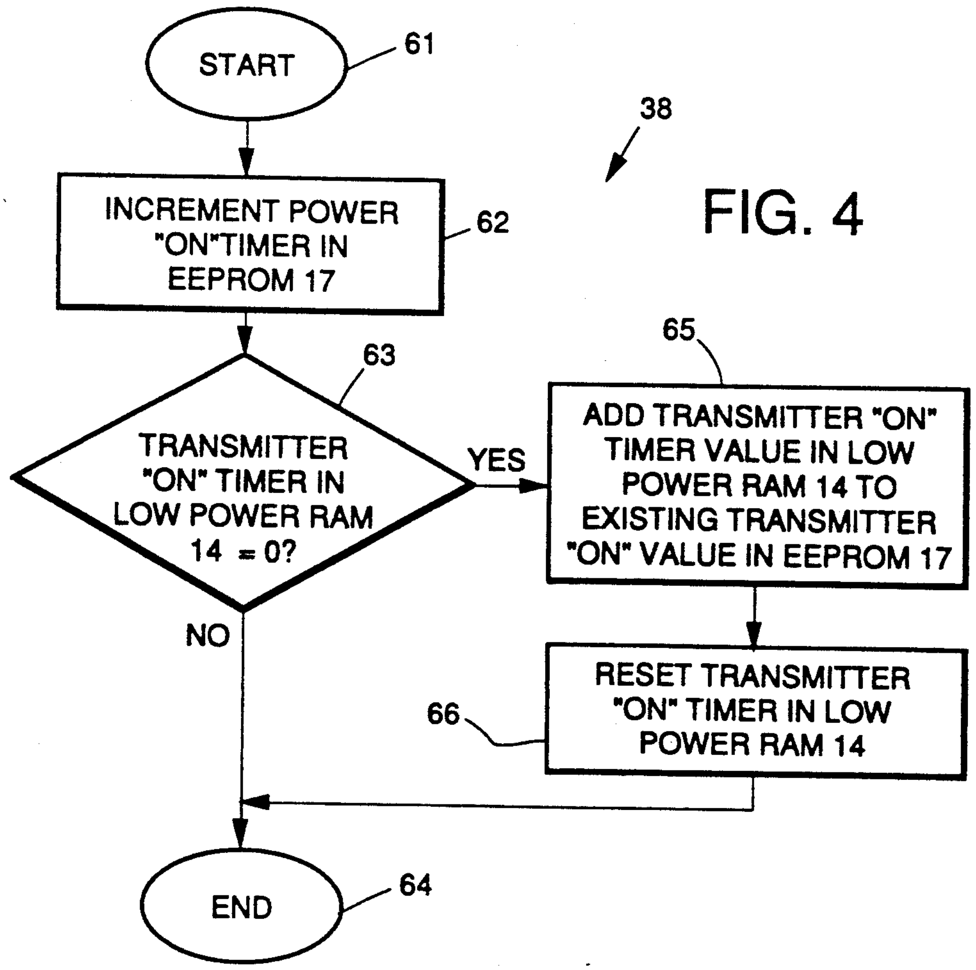

FIG. 4 illustrates a detailed flow diagram of the updating step illustrated by box 38. With reference to FIG. 4, in the nonvolatile memory updating step, the process is started represented by the start symbol 61, and then the power "ON" timer in the EEPROM 17 is incremented in step 62. A decision is then made whether the transmitter "ON" timer in the low power RAM 14 is equal to zero, as indicated by box 63. If the decision is yes, the transmitter "ON" timer value in the low power RAM 14 is added to the existing transmitter "ON" value in the EEPROM 17, as indicated by box 65. Then the transmitter "ON" timer is reset in the low power RAM 14, as indicated by box 66, and then the process stops and returns to the flow of FIG. 2, as indicated by the END symbol in box 64. If the transmitter "ON" timer in the low power RAM 14 is not equal to zero, the process stops and returns to the flow of FIG. 2, indicated by the END symbol in box 54.

If the timer data has been incremented (updated), or if this action has been skipped by way of path 42, a decision is then made if the ignition switch of the vehicle is off, using the ignition sense input 21, as indicated by box 39. If the ignition switch is off, then the method loops, by way of path 43, to its beginning. If the ignition switch is still on, then the method loops, by way of path 44, to a point where the decision is made regarding whether the period of the timer circuit 15 has elapsed, identified by box 34.

Thus there has been described a new and improved cumulative operational timer system and timing computational method for use in cellular telephones. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A cumulative operational timer system for use in a cellular telephone, comprising:
- a timer for generating a timing signal at predetermined regular intervals;
- a volatile memory for receiving the timing signals, for counting the timing signals received when the telephone is "ON" and for generating a first cumulative time signal each time an integer multiple of a predetermined number of timing signals has been received: and
- a nonvolatile memory for receiving the first cumulative time signals and for counting the number of such signals received to provide a nonvolatile indication of the cumulative "ON" time of the telephone.

2. The system of claim 1 further comprising:
- a second volatile memory for receiving the timing signals when calls are being made on the telephone and for generating a second cumulative time signal each time an integer multiple of a predetermined number of timing signals has been received; and
- a second nonvolatile memory for receiving the second cumulative time value signals and for counting the number of such signals received to provide a nonvolatile indication of the cumulative calling time of the telephone.

3. The system of claim 1 wherein the volatile memory is powered whether the telephone is in a power "ON" or "OFF" state.

4. The system of claim 1 wherein the volatile memory is a low power random access memory.

5. The system of claim 1 wherein the nonvolatile memory is an electrically erasable programmable read only memory.

6. The system of claim 1 further comprising a digital signal processor and wherein the volatile memory and the timer are comprised by the digital signal processor.

7. The system of claim 6 wherein the digital signal processor comprises a program for operating the volatile memory and for transmitting the cumulative time signals to the nonvolatile memory.

8. The system of claim 1 further comprising a test interface for allowing the nonvolatile indication of cumulative time to be read from the nonvolatile memory.

9. The system of claim 1 further comprising an ignition sense sensor for detecting when the ignition sense is "OFF", the sensor being in communication with a control circuit for minimizing power consumption by the system and for inhibiting the generation of signals upon the receipt of an "OFF" detection from the ignition sense sensor.

10. The system of claim 1 wherein the predetermined regular interval is approximately one millisecond.

11. The system of claim 1 wherein the predetermined number of timing signals corresponds to a time period of approximately eight hours.

12. A cumulative operational timer system for use in a cellular telephone, comprising:
- a timer for generating a timing signal at predetermined regular intervals;
- a volatile memory for receiving the timing signals, for counting the timing signals received when calls are being made on the telephone and for generating a first cumulative time signal each time an integer multiple of a predetermined number of timing signals has been received; and a nonvolatile memory for receiving the first cumulative time signals and for counting the number of such signals received to provide a nonvolatile indication of the cumulative calling time of the telephone.

13. The system of claim 12 further comprising a digital signal processor and wherein the volatile memory and the timer are comprised by the digital signal processor.

14. The system of claim 12 further comprising a test interface for allowing the nonvolatile indication of cumulative time to be read from the nonvolatile memory.

15. A cumulative timing method for use in a cellular telephone comprising the steps of:

receiving timing signals at predetermined regular intervals when the telephone is "ON";

counting the received timing signals;

storing the value of the timing signal count;

counting each time that the number of received timing signals reaches an integer multiple of a predetermined number; and storing the value of the integer multiple count in a nonvolatile memory to provide a nonvolatile indication of the cumulative "ON" time of the telephone.

16. The method of claim 5 further comprising the steps of:

receiving a second set of timing signals at predetermined regular intervals when a call is being made on the telephone;

counting the second set of received timing signals to form a second signal count;

storing the value of the second signal count;

counting each time that the number of the second set of received timing signals reaches an integer multiple of a predetermined number to form a second integer multiple count; and storing the value of the second integer multiple count in a second nonvolatile memory to provide a nonvolatile indication of the cumulative calling time of the telephone.

17. The method of claim 15 wherein the cellular telephone is mounted in a motor vehicle having an ignition and further comprising the step of sensing the sense of the vehicle ignition and disabling all other steps of the method when the vehicle ignition sense is "OFF".

18. The method of claim 17 further comprising the step of sensing the sense of the vehicle ignition and reenabling all other steps of the method when the vehicle ignition sense is "ON".

19. The method of claim 15 wherein the step of storing the value of the timing signal count comprises storing the timing signal count in a random access memory.

20. A cumulative timing method for use in a cellular telephone comprising the steps of:

receiving timing signals at predetermined regular intervals when calls are being made on the telephone;

counting the received timing signals;

storing the value of the count;

counting each time that the number of received timing signals reaches an integer multiple of a predetermined number; and storing the value of the integer multiple count in a nonvolatile memory to provide a nonvolatile indication of the cumulative calling time of the telephone.

21. The method of claim 20 wherein the cellular telephone is mounted in a motor vehicle having an ignition and further comprising the step of sensing the sense of the vehicle ignition and disabling all other steps of the method when the vehicle ignition sense is "OFF".

22. The method of claim 20 further comprising the step of sensing the sense of the vehicle ignition and reenabling all other steps of the method when the vehicle ignition sense is "ON".

23. The method of claim 20 wherein the step of storing the value of the timing signal count comprises storing the timing signal count in a random access memory.

* * * * *